United States Patent
Usui et al.

(10) Patent No.: US 7,176,660 B2
(45) Date of Patent: Feb. 13, 2007

(54) SWITCHING POWER SOURCE APPARATUS AND POWER FACTOR CORRECTOR

(75) Inventors: Hiroshi Usui, Niiza (JP); Syohei Osaka, Niiza (JP)

(73) Assignee: Sanken Electric Co., Ltd. (JP)

( * ) Notice: Subject to any disclaimer, the term of this patent is extended or adjusted under 35 U.S.C. 154(b) by 64 days.

(21) Appl. No.: 11/143,026

(22) Filed: May 31, 2005

(65) Prior Publication Data

US 2005/0269997 A1 Dec. 8, 2005

(30) Foreign Application Priority Data

Jun. 4, 2004 (JP) ............................ P2004-167493

(51) Int. Cl.
*G05F 1/70* (2006.01)

(52) U.S. Cl. .................................... 323/207
(58) Field of Classification Search ............... 323/207; 363/20, 21.07, 21.15, 86
See application file for complete search history.

(56) References Cited

U.S. PATENT DOCUMENTS 5,359,274 A * 10/1994 Bandel ....................... 323/207

FOREIGN PATENT DOCUMENTS

JP 08-111975 4/1996

* cited by examiner

*Primary Examiner*—Shawn Riley
(74) *Attorney, Agent, or Firm*—Kilpatrick Stockton LLP (57) ABSTRACT

A power factor corrector is connected to an AC power source, to provide a first DC voltage. A DC-DC converter supplies the first DC voltage from the power factor corrector to a primary winding of a transformer. A first rectifying/smoothing circuit rectifies and smoothes a voltage generated by a secondary winding of the transformer and supplies the rectified-and-smoothed voltage to a load. A second rectifying/smoothing circuit rectifies and smoothes a voltage generated by a control winding of the transformer. A light-load detector detects if an output ripple of the second rectifying/smoothing circuit is equal to or greater than a predetermined value, determines upon detection that the switching operation has decreased the frequency thereof or has shifted to an intermittent oscillation, and stops the power factor corrector.

10 Claims, 6 Drawing Sheets

SWITCHING POWER SOURCE APPARATUS AND POWER FACTOR CORRECTOR

BACKGROUND OF THE INVENTION

The present invention relates to a switching power source apparatus with a power factor corrector and a DC-DC converter and to a power factor corrector. In particular, the present invention relates to a technique to reduce power consumption during a standby period of such a switching power source apparatus.

Figure 1:
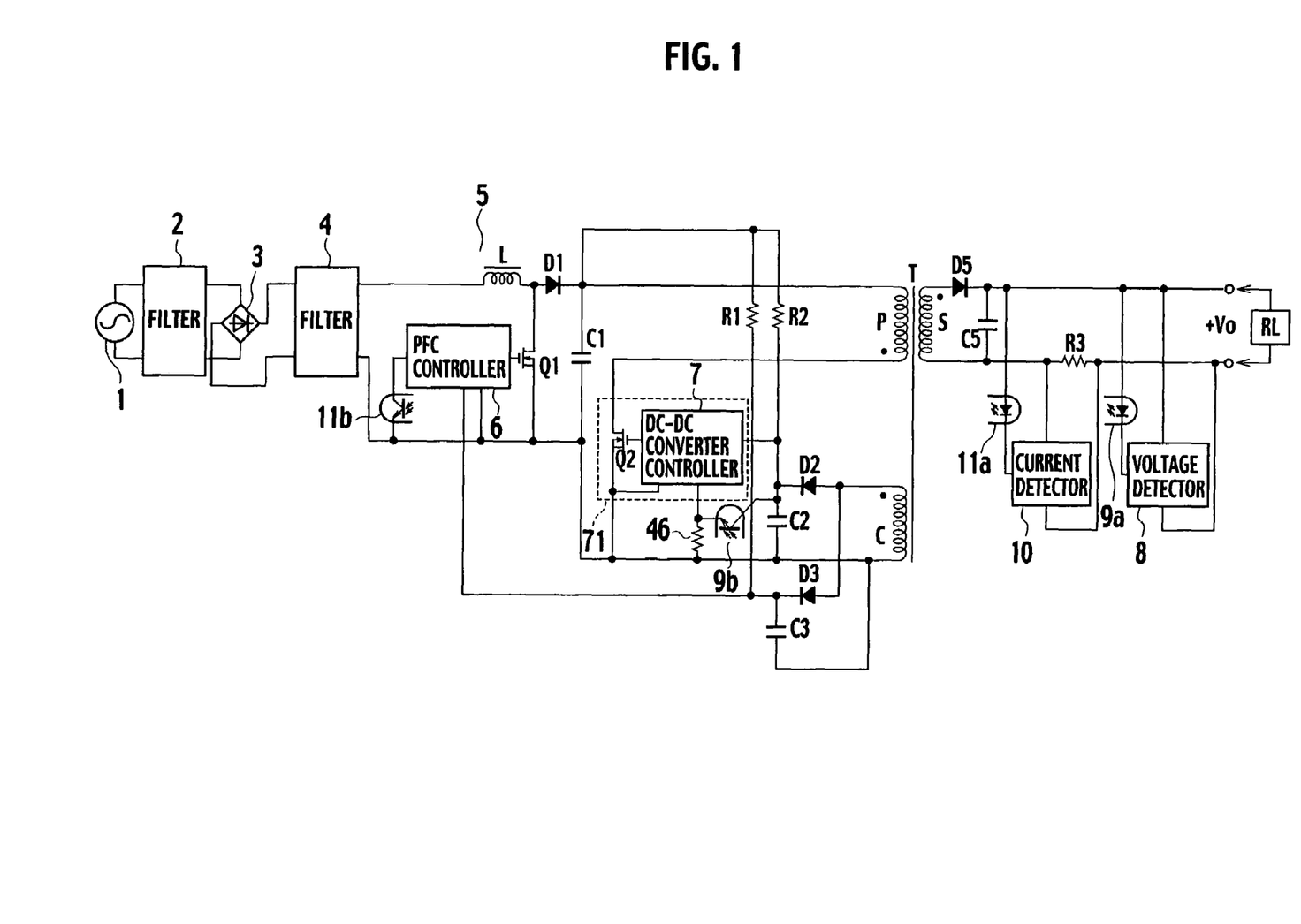
FIG. 1 is a circuit diagram showing a switching power source apparatus according to a related art.

FIG. 1 shows a switching power source apparatus according to a related art. This apparatus has a power factor corrector (PFC) and a DC-DC converter connected to the PFC. The PFC conforms to input harmonic current regulations stipulated in IEC61000-3-2 recently established.

Operation of the apparatus shown in FIG. 1 will be explained. An AC power source 1 provides a sinusoidal voltage, which is passed through a filter 2 and is full-wave-rectified with a diode bridge 3. The full-wave-rectified voltage is passed through a filter 4 and is supplied to the PFC 5. The full-wave-rectified voltage is passed through a reactor L, a diode D1 and a starting resistor R1 for the PFC 5 and is used to charge a power source capacitor C3 for a PFC controller 6. At the same time, the full-wave-rectified voltage passed through the reactor L and diode D1 is supplied to a starting resistor R2 for the DC-DC converter and is used to charge a power source capacitor C2 for a DC-DC converter controller 7.

When the voltage of the power source capacitor C3 reaches a starting voltage of the PFC controller 6, the PFC controller 6 starts to turn on and off a switching element Q1. This ON/OFF operation is hereinafter referred to as "switching operation." The switching operation drives the PFC 5.

The PFC 5 has the reactor L, switching element Q1, diode D1, output capacitor C1, and PFC controller 6 and serves as a step-up chopper. In the PFC 5, the full-wave-rectified voltage from the filter 4 is supplied to a series circuit consisting of the reactor L and switching element Q1. The PFC controller 6 turns on and off the switching element Q1, to correct the power factor of the AC power source 1. At the same time, the diode D1 and output capacitor C1 of the PFC 5 provide a DC voltage. The PFC controller 6 receives a voltage of the output capacitor C1 detected by a voltage detector (not shown), and according to the value of the voltage, controls the switching operation of the switching element Q1 so that the output capacitor C1 keeps a constant DC value at the terminals thereof.

The PFC controller 6 multiplies an error voltage, which is obtained by amplifying an error between the voltage of the output capacitor C1 and a reference voltage, by the full-wave-rectified voltage from the filter 4 and provides a multiplied output voltage. The switching element Q1 is connected in series to a current detecting resistor (not shown) that detects an input current. The PFC controller 6 finds an error between a voltage proportional to the detected input current and the multiplied output voltage, amplifies the error, and provides an error voltage. Thereafter, the PFC controller 6 generates a pulse signal that is, for example, ON if the error voltage is equal to or greater than the value of a triangular wave signal and is OFF if the error voltage is lower than the value of the triangular wave signal. The pulse signal is applied to the gate of the switching element Q1. This results in shaping, every half cycle, the input current passed to the current detecting resistor into a sinusoidal wave analogous to the shape of an input voltage to the AC power source 1, thereby correcting the power factor of the AC power source 1.

When the voltage of the power source capacitor C2 reaches a starting voltage of the DC-DC converter controller 7, the controller 7 starts the switching operation of a switching element Q2. When the switching element Q2 is turned ON, a current is passed to a primary winding P of a transformer T, and therefore, the transformer T accumulates energy. When the switching element Q2 is turned off, the energy accumulated in the transformer T is discharged as a voltage from a secondary winding S of the transformer T. The voltage is rectified and smoothed through a diode D5 and a smoothing capacitor C5 and is supplied as a first DC voltage Vo from an output terminal to a load RL.

The first DC voltage Vo supplied to the load RL is compared in a voltage detector 8 with a reference voltage (not shown). The voltage detector 8 provides an error signal representative of the difference between the first DC voltage Vo and the reference voltage to a light emitter 9a of a photocoupler. In response to the error signal, the light emitter 9a emits light. The light representative of the error signal is received by a photodetector 9b of the photocoupler and is transferred to the DC-DC converter controller 7. Based on the received signal, the converter controller 7 carries out PWM control to adjust an ON-time of the switching element Q2 so as to maintain the first DC voltage Vo at a constant value.

When the switching element Q2 is turned off, the energy accumulated in the transformer T is also discharged from a control winding C of the transformer T. The discharged energy is transferred through a diode D2 to the power source capacitor C2 and through a diode D3 to the power source capacitor C3. The voltage of the power source capacitors C2 and C3 serves as source power for the PFC controller 6 and DC-DC converter controller 7.

The switching power source apparatus of FIG. 1 detects a light- or no-load state according to a voltage drop at a current detecting resistor R3 on the secondary side of the transformer T. The light- or no-load state decreases a load current, thereby dropping a terminal voltage of the current detecting resistor R3. A current detector 10 compares the terminal voltage of the current detecting resistor R3 with a reference voltage (not shown), and if the difference between the terminal voltage and the reference voltage is equal to or lower than a predetermined value, makes a light emitter 11a of a photocoupler emit light. Then, a photodetector 11b of the photocoupler turns on to turn off the PFC controller 6 on the primary side of the transformer T.

In this way, the related art can stop the operation of the PFC 5 in a light- or no-load state, to reduce the switching loss of the PFC 5 as well as cutting power consumption during a standby period. The harmonic current regulations mentioned above do not regulate an input power of 75 W or below, and therefore, there is no problem of stopping the PFC 5 and is rather preferable from a worldwide trend of minimizing standby power.

A technique for stopping a power factor corrector (PFC) in a light- or no-load state is disclosed in Japanese Unexamined Patent Application Publication No. Hei-8-111975. According to the disclosure, a DC-DC converter detects a light-load state by utilizing a phenomenon that the voltage of a tertiary winding of a transformer decreases in the light-load state. Upon detecting a light-load state, the disclosure cuts an auxiliary power source for the PFC, to stop the PFC.

SUMMARY OF THE INVENTION

According to the switching power source apparatus of the related art shown in FIG. 1, the current detecting resistor R3 for detecting a load current causes a power loss due to a voltage drop. In addition, the apparatus needs a signal transmitter such as a photocoupler that is expensive and involves the primary and secondary sides of a transformer that must be insulated from each other. In this way, the apparatus of FIG. 1 is expensive and involves a complicated circuitry.

According to the disclosure of the patent document mentioned above, the tertiary winding of a transformer shows only a little voltage change because the DC-DC converter of the disclosure employs a voltage stabilizing scheme. Namely, the tertiary winding does not provide a large voltage change with respect to a light-load state, and therefore, it is difficult for this disclosure to surely detect the light-load state.

According to the present invention, a switching power source apparatus and a power factor corrector, each having a simple structure, being inexpensive, and capable of reducing power consumption during a standby period are provided.

A first technical aspect of the present invention provides a switching power source apparatus having a power factor corrector and a DC-DC converter. The power factor corrector is connected to an AC power source and provides a first DC voltage. The DC-DC converter applies the first DC voltage to a primary winding of a transformer, carries out an ON/OFF switching operation with a switching element, to convert the first DC voltage into a second DC voltage, and in a light- or no-load state, decreases the frequency of the switching operation or shifts to an intermittent oscillation. The switching power source apparatus includes a first rectifying/smoothing circuit configured to rectify a voltage generated by a secondary winding of the transformer, smooth the rectified voltage with a first smoothing capacitor, and supply the rectified-and-smoothed voltage to a load, a second rectifying/smoothing circuit configured to rectify a voltage generated by a control winding of the transformer and smooth the rectified voltage with a second smoothing capacitor, and a light-load detector configured to detect if an output ripple of the second rectifying/smoothing circuit is equal to or greater than a predetermined value, determine upon detection that the switching operation has decreased the frequency thereof or has changed to an intermittent oscillation, and stop the power factor corrector.

According to a second technical aspect of the present invention, a second time constant determined by an impedance of the light-load detector and the second smoothing capacitor is set to be smaller than a first time constant determined by an impedance of the load and the first smoothing capacitor.

According to a third technical aspect of the present invention, the light-load detector detects that the output ripple is equal to or greater than the predetermined value if an average output voltage of the second rectifying/smoothing circuit or a voltage corresponding to the average output voltage is equal to or smaller than a reference voltage.

According to a fourth technical aspect of the present invention, the power factor corrector has a controller and the light-load detector. The controller turns on and off a second switching element, to rectify and convert an AC source voltage from the AC power source into the first DC voltage. The controller and light-load detector are integrated.

According to a fifth technical aspect of the present invention, there is provided a power factor corrector connected to a DC-DC converter. The DC-DC converter supplies a first DC voltage to a primary winding of a transformer, carries out an ON/OFF switching operation with a switching element, to convert the first DC voltage into a second DC voltage, and in a light- or no-load state, decreases the frequency of the switching operation or shifts to an intermittent oscillation. The power factor corrector has a controller and a light-load detector. The controller turns on and off a second switching element, to rectify and convert an AC source voltage from an AC power source into the first DC voltage. The light-load detector detects if an output ripple of a rectifying/smoothing circuit, which rectifies and smoothes a voltage generated by a control winding of the transformer, is equal to or greater than a predetermined value, determines upon detection that the switching operation has decreased the frequency thereof or has changed to an intermittent oscillation, and stops the controller.

According to a sixth technical aspect of the present invention, the controller and light-load detector of the power factor corrector are integrated.

DESCRIPTION OF THE PREFERRED EMBODIMENTS

Switching power source apparatuses according to embodiments of the present invention will be explained in detail with reference to the drawings.

First Embodiment

Figure 2:
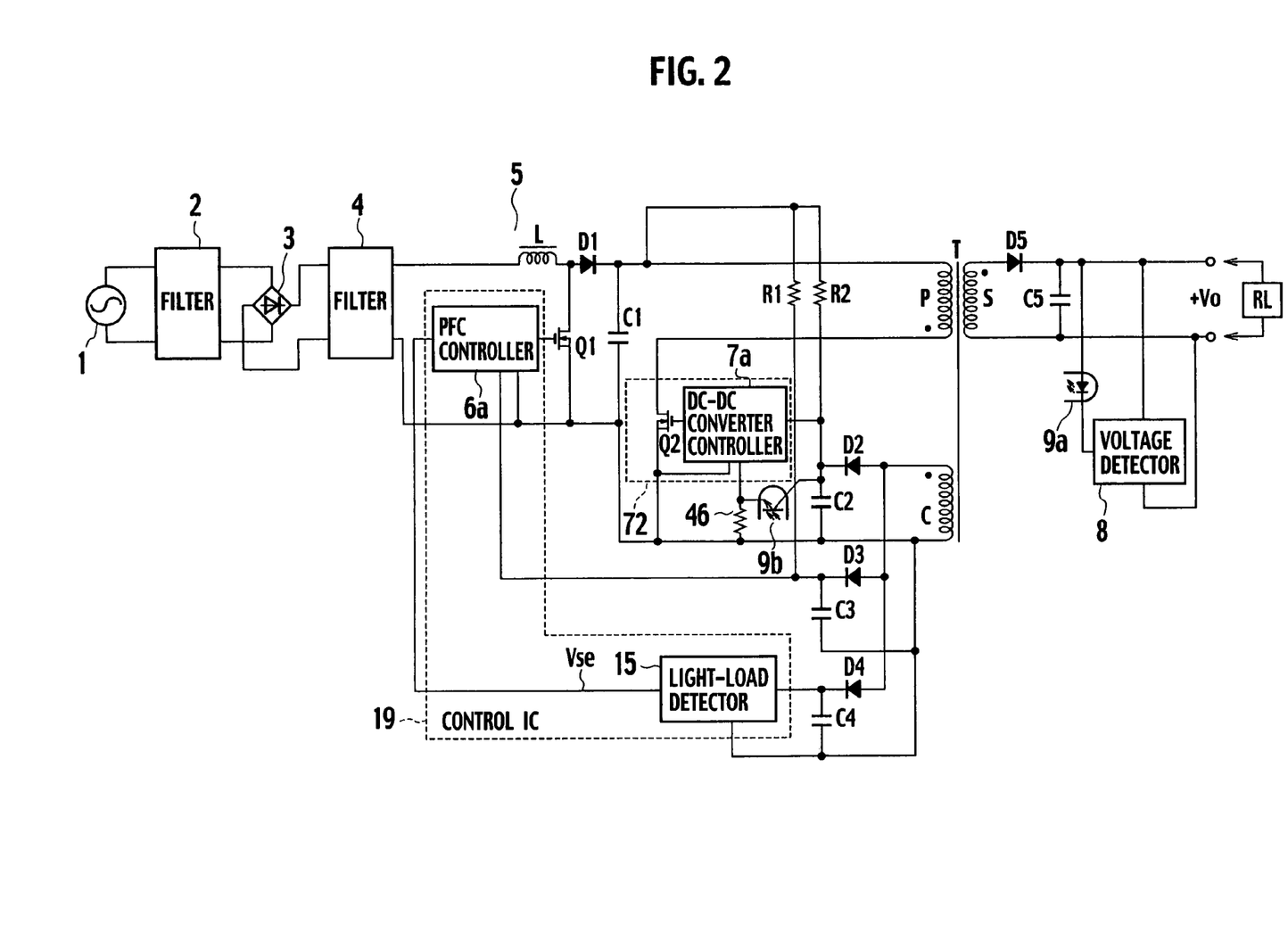
FIG. 2 is a circuit diagram showing a switching power source apparatus according to a first embodiment of the present invention.

FIG. 2 is a circuit diagram showing a switching power source apparatus according to a first embodiment of the present invention. The apparatus of the first embodiment omits, from the switching power source apparatus of the related art shown in FIG. 1, the current detecting resistor R3 and current detector 10 on the secondary side of the transformer T and the light emitter 11a and photodetector 11b of the photocoupler. The apparatus of the first embodiment employs a diode D4, a smoothing capacitor C4, and a light-load detector 15.

An anode of the diode D4 is connected to a first end of a control winding C of a transformer T. A second end of the control winding C is connected to a first end of the smoothing capacitor C4. A second end of the smoothing capacitor C4 is connected to a cathode of the diode D4. The diode D4 and smoothing capacitor C4 form a second rectifying/smoothing circuit of the present invention. A diode D5 and a smoothing capacitor C5 form a first rectifying/smoothing circuit of the present invention. Each end of the smoothing capacitor C5 is connected to a load. The impedance of the load and the smoothing capacitor C5 provide a first time constant, and the impedance of the light-load detector 15 and the smoothing capacitor C4 provide a second time constant that is set to be smaller than the first time constant.

A DC-DC converter according to the first embodiment is provided with a DC-DC converter controller 7a. In a light-load state or no-load state, the converter controller 7a decreases a switching frequency or carries out an intermittent oscillation or a burst oscillation. The converter controller 7a and a switching element Q2 are included in a control IC 72. To reduce a switching loss during a standby state such as a light- or no-load state, the control IC 72 has various standby modes such as an intermittent oscillation mode, a burst oscillation mode, and a low-frequency operation mode.

The first embodiment utmost employs such characteristics of the control IC 72. Upon detecting a shift to a standby mode, the light-load detector 15 of the first embodiment makes a power factor corrector 5 inoperative to reduce power consumption during the standby mode.

Figure 3:
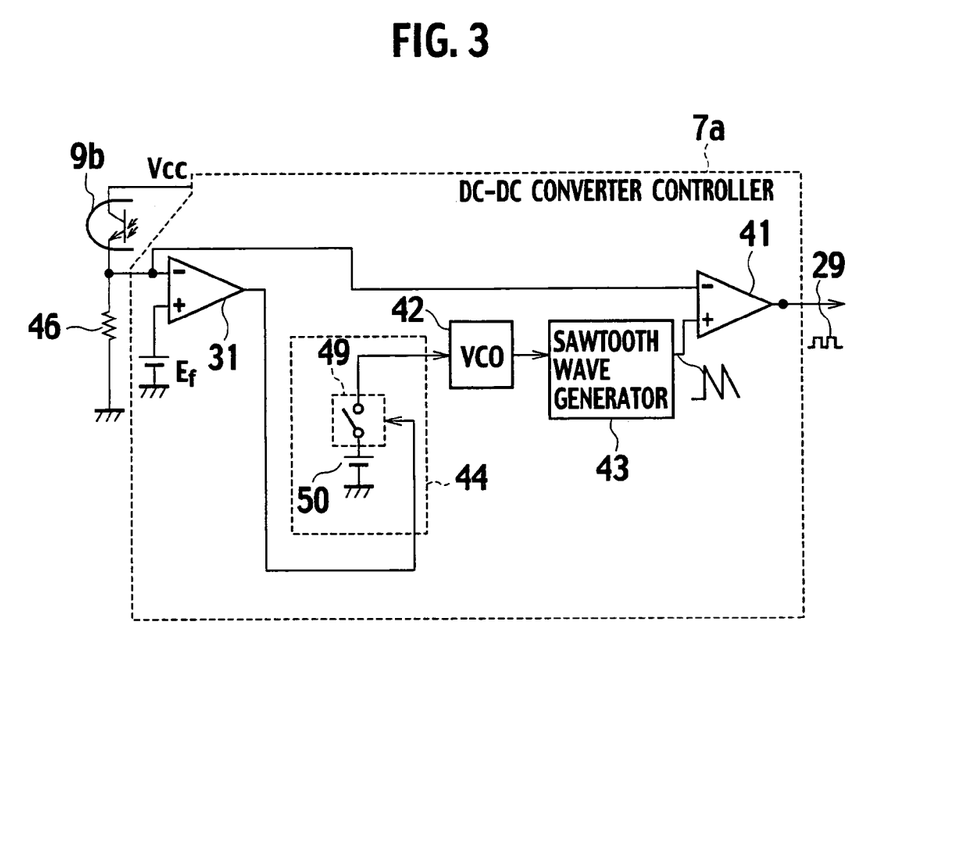
FIG. 3 is a circuit diagram showing an example of a DC-DC converter controller for making a switching element perform an intermittent operation when the apparatus of the first embodiment is in a light-load state.

FIG. 3 is a circuit diagram showing an example configuration of the DC-DC converter controller 7a for intermittently operating the switching element Q2 when the switching power source apparatus is in a light-load state. In FIG. 3, the converter controller 7a intermittently operates (oscillates) the switching element Q2 in a light- or no-load state. To achieve this, the converter controller 7a has a comparator 31, a comparator 41, a voltage-controlled oscillator (VCO) 42, a sawtooth wave generator 43, a mode switch 44, a first switch 49, and a voltage source 50.

The comparator 31 determines that the load (not shown in FIG. 3) connected to the smoothing capacitor C5 is heavy if a terminal voltage of a resistor 46 is lower than a reference voltage Ef. If the terminal voltage of the resistor 46 is equal to or greater than the reference voltage Ef, the comparator 31 determines that the load is light or that there is no load. The comparator 31 outputs a load determination signal to the first switch 49.

The voltage-controlled oscillator (VCO) 42 generates a clock pulse at a first frequency. The sawtooth wave generator 43 generates a sawtooth wave voltage at the same frequency as the output frequency of the VCO 42. The comparator 41 generates a pulse control signal if the sawtooth wave voltage from the sawtooth wave generator 43 is higher than the terminal voltage of the resistor 46. This control signal turns on or off the switching element Q2.

Figure 5:
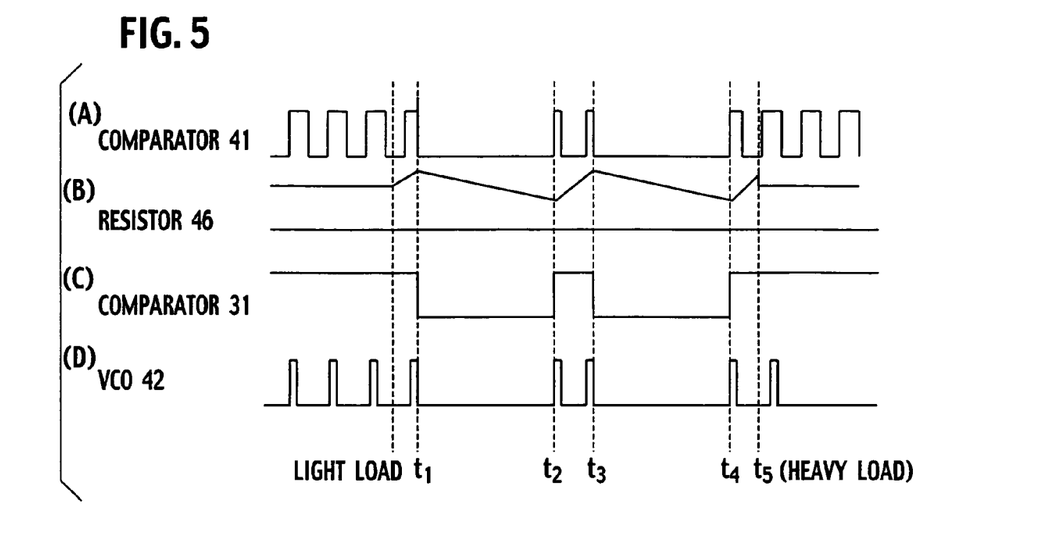
FIG. 5 is a timing chart explaining the intermittent operation of the switching element when the apparatus of the first embodiment is in a light-load state.

The first switch 49 turns on if the output of the comparator 31 is at high level and turns off if it is at low level. FIG. 5 is a timing chart explaining an intermittent operation of the switching element Q2 when the switching power source apparatus of the first embodiment is in a light-load state. In the light-load state, the voltage of the resistor 46 increases to a first threshold value at, for example, time t1. Then, the comparator 31 provides a low-level signal to turn off the first switch 49. As a result, the VCO 42 provides no output, the comparator 41 maintains a low-level signal, and the switching element Q2 stops the on/off operation.

Consequently, the output voltage starts to decrease, and therefore, the voltage of the resistor 46 gradually decreases to a second threshold value at, for example, time t2. Then, the output of the comparator 31 inverts to high level. This results in turning on the first switch 49 so that the VCO 42 provides an output signal and the switching element Q2 starts the switching operation. Then, the output voltage again increases and the voltage of the resistor 46 also increases. When the voltage of the resistor 46 reaches the first threshold value, the switching element Q2 is stopped as mentioned above. These steps are repeated to realize the intermittent operation.

The first switch 49 is turned on before time t1, between t2 and t3, and after t4. The first switch 49 is turned off between t1 and t2 and between t3 and t4. The VCO 42, therefore, provides intermittent output pulses as shown in FIG. 5(D). The comparator 41 also intermittently generates output pulses. An average number of times of switching of the switching element Q2 per unit time for the light-load period between t1 and t5 of FIG. 5 is smaller than an average number of times of switching of the switching element Q2 per unit time for the heavy-load periods before t1 and after t5. This results in reducing a switching loss.

Figure 4:
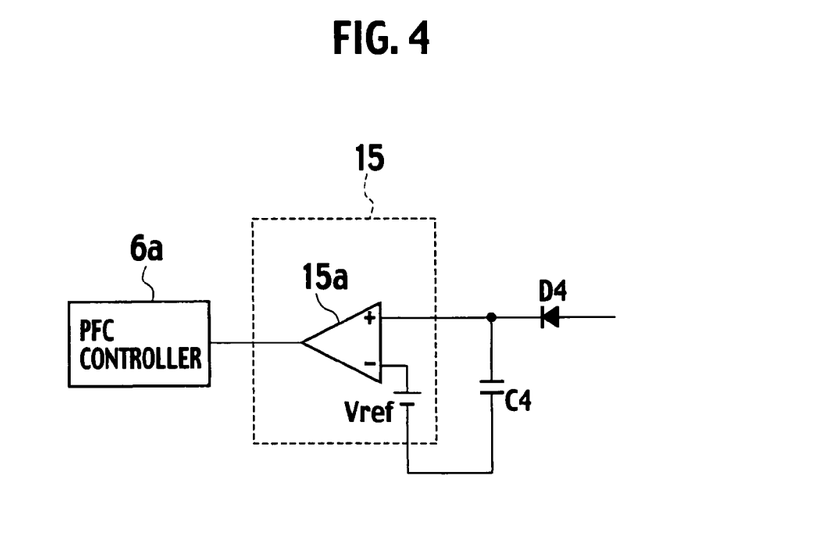
FIG. 4 is a circuit diagram showing a light-load detector arranged in the apparatus of the first embodiment.

The light-load detector 15 detects if an output ripple of the smoothing capacitor C4 is equal to or greater than a predetermined value, determines upon detection that the switching frequency of the switching element Q2 has decreased or has shifted to an intermittent oscillation, and a PFC controller 6a becomes inoperative. FIG. 4 is a circuit diagram showing the details of the light-load detector 15 in the switching power source apparatus according to the first embodiment. In FIG. 4, the light-load detector 15 has a comparator 15a. The comparator 15a detects if a voltage of the smoothing capacitor C4 is equal to or lower than a reference voltage Vref, determines upon detection that the switching frequency of the switching element Q2 has decreased or has shifted to an intermittent oscillation, and outputs a stop signal to the PFC controller 6a to stop the same.

Figure 6:
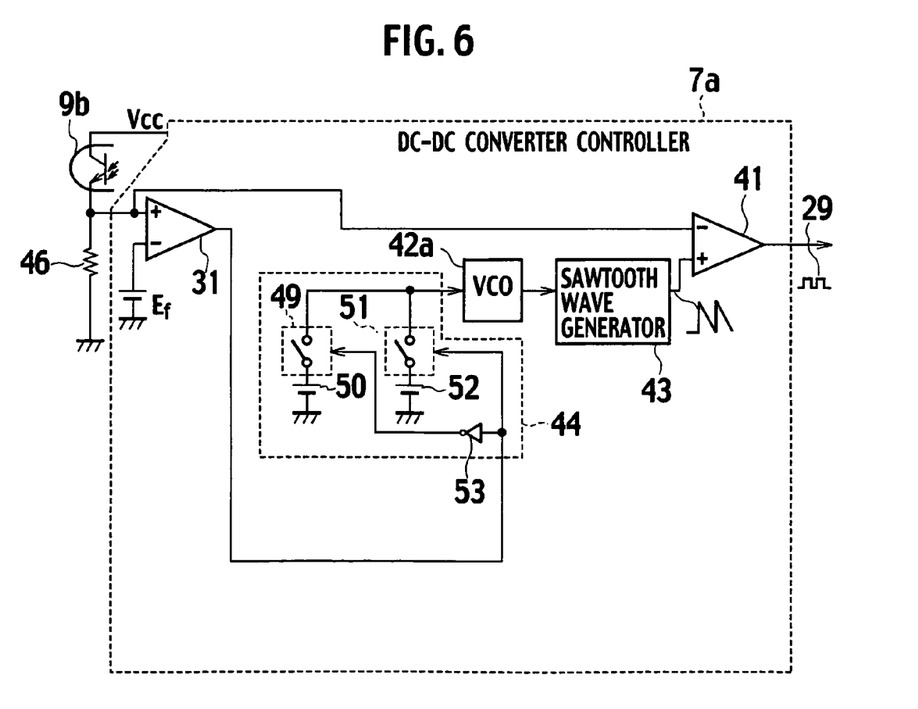
FIG. 6 is a circuit diagram showing an example of a DC-DC converter controller for decreasing the switching frequency of the switching element when the apparatus of the first embodiment is in a light-load state.

FIG. 6 is a circuit diagram showing an example configuration of the DC-DC converter controller 7a for decreasing the switching frequency of the switching element Q2 when the switching power source apparatus according to the first embodiment is in a light-load state. To decrease the switching frequency of the switching element Q2 in a light- or no-load state, the converter controller 7a of FIG. 6 has a comparator 31, a comparator 41, a voltage-controlled oscillator (VOC) 42a, a sawtooth wave generator 43, a mode switch 44, a first switch 49, a voltage source 50, a second switch 51, a voltage source 52, and a NOT circuit 53.

The first switch 49 turns on when receiving a load determination signal of low level (indicative of heavy load) from the comparator 31. The second switch 51 turns on when receiving a load determination signal of high level (indicative of no load or light load) from the comparator 31. Namely, the mode switch 44 controls the oscillation frequency of the VCO 42a in response to the output of the comparator 31. The VCO 42a generates a clock pulse at a first frequency when the first switch 49 turns on (heavy load) and generates a clock pulse at a second frequency that is sufficiently lower than the first frequency when the second switch 51 turns on (no load or light load). Accordingly, the frequency of output pulses of the comparator 41 decreases in a light- or no-load state.

Figure 7:
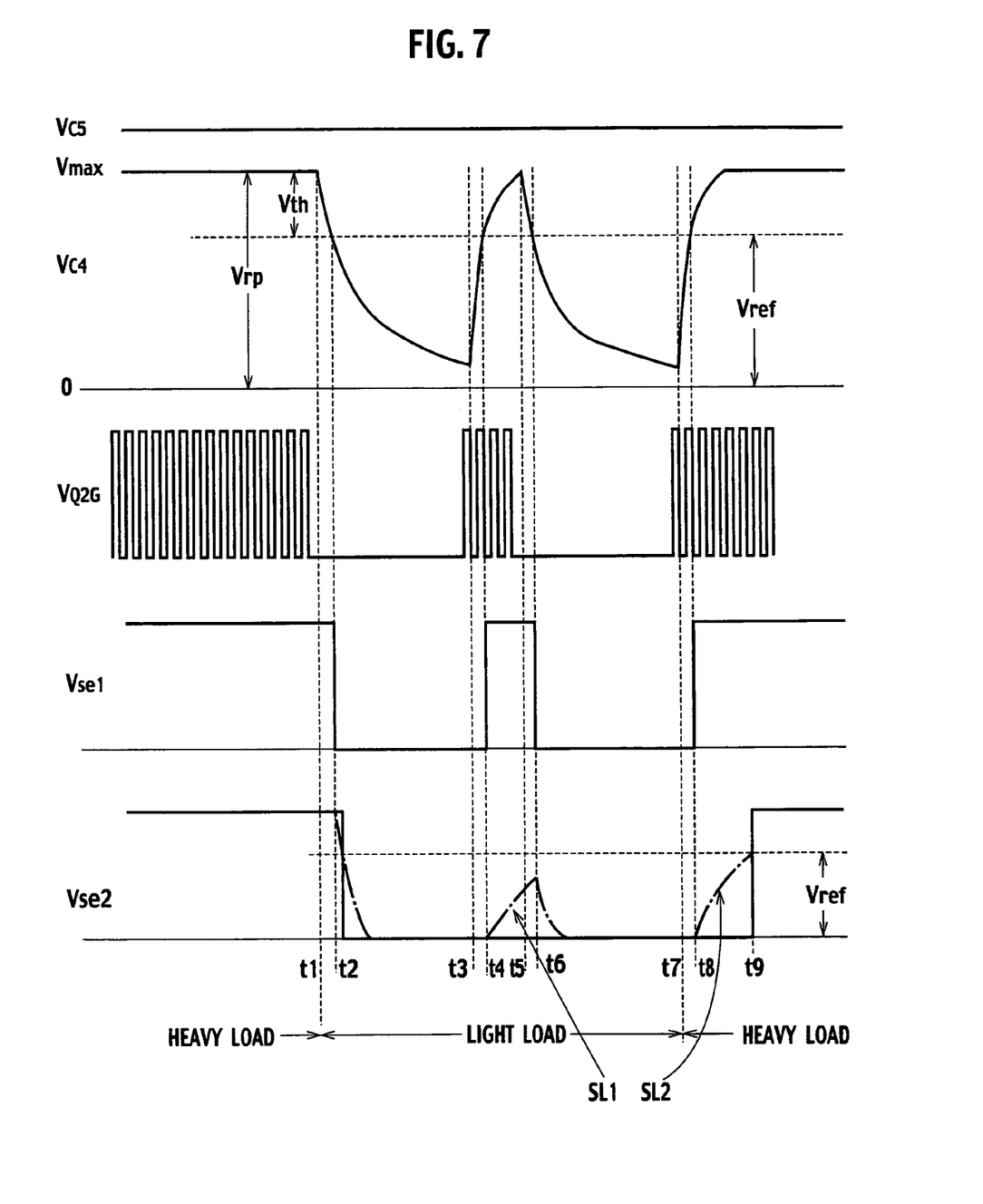
FIG. 7 is a timing chart explaining an operation of the light-load detector when the apparatus of the first embodiment is in a light-load state and in a heavy-load state.

Operation of the switching power source apparatus according to the first embodiment will be explained with reference to FIG. 7, which is a timing chart explaining the operation of the light-load detector 15 when the switching power source apparatus of the first embodiment is in a light-load state and in a heavy-load state. In FIG. 7, VC4 is a voltage of the smoothing capacitor C4, VC5 is a voltage of the smoothing capacitor C5, VQ2G is a gate voltage of the switching element Q2, and Vse1 and Vse2 are voltage signals provided from the light-load detector 15.

The voltage VC4 of the smoothing capacitor C4 involves a maximum voltage Vmax, an output ripple Vrp, a predetermined value Vth for the output ripple Vrp, and a reference voltage Vref. In this example, detecting that the output ripple has decreased from the maximum voltage Vmax by the predetermined value Vth or greater is replaced by detecting that the voltage VC4 of the smoothing capacitor C4 has decreased to or lower than the reference voltage Vref.

An intermittent operation of the switching element Q2 conducted by the converter controller 7a shown in FIG. 3 in a light-load state will be explained.

During a heavy-load state, a normal operation is carried out. When a light-load state occurs, the control IC 72 of the DC-DC converter shifts to a standby mode and the switching element Q2 intermittently oscillates from t1 to t7 at a frequency that is extremely lower than the switching frequency of the normal operation. At this time, the voltage VC5 of the smoothing capacitor C5 is controlled to substantially maintain a constant value in both the heavy-load state and light-load state.

In the light-load state, the switching element Q2 intermittently oscillates at a frequency extremely lower than a normal switching frequency. During no-oscillation periods (t1 to t3 and t5 to t7), the voltage VC4 of the smoothing capacitor C4 drops due to discharge with the time constant of the smoothing capacitor C4 and the load impedance of the light-load detector 15, to create a large ripple.

The light-load detector 15 compares the voltage VC4 of the smoothing capacitor C4 with the reference voltage Vref, and when the voltage VC4 decreases below the reference voltage Vref (t2 to t4 and t6 to t8), provides a low-level voltage signal Vse1 to the PFC controller 6a, to thereby stop the PFC controller 6a. As a result, the PFC 5 becomes inoperative for nearly the entire intermittent oscillation period.

In the intermittent oscillation period (t1 to t7), the internal time constant of the light-load detector 15 may further increase, and therefore, the voltage VC4 of the smoothing capacitor C4 may not increase up to the reference voltage Vref. In this case, the output signal from the light-load detector 15 to the PFC controller 6a will be the voltage signal Vse2 shown in FIG. 7. Namely, during the intermittent oscillation period, the PFC 5 can be continuously stopped. At this time, the voltage VC4 of the smoothing capacitor C4 is expressed with integral waveforms SL1 and SL2 due to the internal time constant of the light-load detector 15.

In this way, the light-load detector 15 of the switching power source apparatus according to the first embodiment detects if the output ripple of the smoothing capacitor C4 is equal to or greater than a predetermined value, determines upon detection that the switching element Q2 has shifted to an intermittent oscillation state, and stops the PFC controller 6a. The apparatus of the first embodiment can externally detect the start of a standby operation of the DC-DC converter at low cost and surely stop the PFC 5, thereby reducing power consumption during the standby operation.

There is no need for the converter controller 7a of the DC-DC converter to output a signal indicating that the DC-DC converter has shifted to a standby state. This results in reducing the number of control terminals of the converter controller 7a and realizing a hybrid IC package containing the DC-DC converter at low cost.

According to the first embodiment, the time constant determined by the impedance of the light-load detector 15 and the smoothing capacitor C4 is lower than the time constant determined by the impedance of the load connected to the smoothing capacitor C5 and the smoothing capacitor C5. This results in further increasing an output ripple of the smoothing capacitor C4, to widen the difference between an intermittent state and a normal state and surely detect a standby mode.

The light-load detector 15 may convert a ripple voltage of the smoothing capacitor C4 into an average output voltage or a voltage corresponding to the average output voltage and detect a standby operation according to the voltage. The light-load detector 15 may employ a hysteresis comparator that surely switches the PFC controller 6a between ON and OFF states.

Second Embodiment

A switching power source apparatus according to a second embodiment of the present invention will be explained with reference to FIG. 8.

Figure 8:
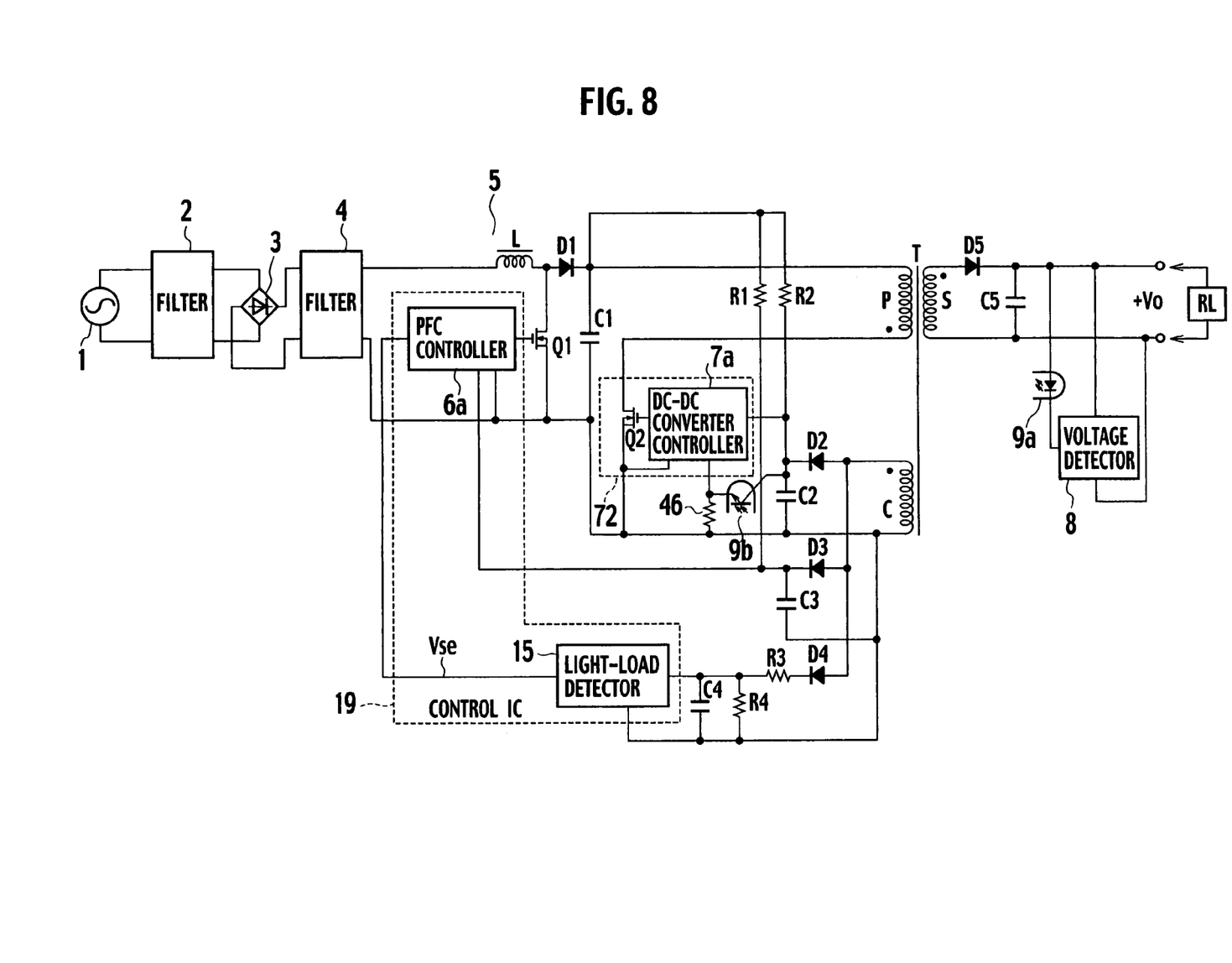
FIG. 8 is a circuit diagram showing a switching power source apparatus according to a second embodiment of the present invention.

In FIG. 8, a first end of a control winding C of a transformer T is connected to an anode of a diode D4. A cathode of the diode D4 is connected to a first end of a resistor R3. A second end of the resistor R3 is connected to a first end of a resistor R4 and a first end of a smoothing capacitor C4. A second end of the control winding C is connected to a second end of the smoothing capacitor C4 and a second end of the resistor R4. Each end of the smoothing capacitor C4 and each end of the resistor R4 are connected to a light-load detector 15.

The other parts of the second embodiment are the same as those of the first embodiment, and therefore, the same parts are represented with the same reference marks to omit the detailed explanation thereof.

The switching power source apparatus of the second embodiment shown in FIG. 8 differs from that of the first embodiment shown in FIG. 2 in a way of generating voltage with the smoothing capacitor C4. According to the first embodiment, the smoothing capacitor C4 simply rectifies and smoothes a voltage generated by the control winding C of the transformer T and uses the voltage for detecting a standby state. According to the second embodiment, the control winding C of the transformer T provides a voltage, which is rectified. The rectified voltage is passed through a low-pass filter that consists of the resistors R3 and R4 and smoothing capacitor C4. Thereafter, a terminal voltage of the smoothing capacitor C4 is supplied to the light-load detector 15. The terminal voltage of the smoothing capacitor C4 is an average of the rectified voltage from the control winding C of the transformer T.

If the average output voltage of the smoothing capacitor C4 (or a voltage corresponding to the average output voltage) is equal to or smaller than a reference voltage, the light-load detector 15 determines that an output ripple has exceeded a predetermined value. In a standby operation, the number of times of switching greatly decreases, and therefore, the average output voltage drastically decreases. Accordingly, the light-load detector 15 can surely detect the standby operation and turn off a PFC controller 6a.

The PFC controller 6a and light-load detector 15 are incorporated in a control IC 19 for a power factor corrector (PFC) 5, to realize the standby operation detecting function with a small number of parts. Input terminals of the light-load detector 15 may be used as ON/OFF terminals. This enables the light-load detector 15 to be incorporated in the control IC 19 without increasing the number of pins of the control IC 19 and the cost thereof. The PFC 5 and DC-DC converter may be integrated into one circuit.

Effect of the Invention

According to the first technical aspect of the present invention, the light-load detector detects if an output ripple of the second rectifying/smoothing circuit is equal to or greater than a predetermined value, determines upon detection that the switching frequency of the switching element has decreased or has shifted to an intermittent oscillation, and stops the power factor corrector (PFC). This aspect can externally and economically detect if the DC-DC converter has shifted to a standby operation, surely stop the PFC, and reduce power consumption during the standby operation. There is no need for the DC-DC converter controller to output a signal indicating that the DC-DC converter has shifted to a standby operation. This reduces the number of control terminals of the controller and enables the DC-DC converter to be arranged in an inexpensive hybrid IC package.

According to the second technical aspect of the present invention, the second time constant determined by the impedance of the light-load detector and the second smoothing capacitor is smaller than the first time constant determined by the impedance of a load and the first smoothing capacitor. This further increases the output ripple of the second rectifying/smoothing circuit, sharpens the difference between a standby (intermittent) operation and a normal operation, and surely detects the standby operation.

According to the third technical aspect of the present invention, the light-load detector detects if an average output voltage of the second rectifying/smoothing circuit or a voltage corresponding to the average output voltage is equal to or lower than a reference voltage and determines upon detection that an output ripple is equal to or greater than a predetermined value. This results in surely detecting a standby operation and stopping the PFC.

According to the fifth technical aspect of the present invention, the light-load detector in the PFC detects if an output ripple of the second rectifying/smoothing circuit is equal to or greater than a predetermined value, determines upon detection that the switching frequency of the switching element has decreased or has shifted to an intermittent oscillation (standby operation), and stops the DC-DC converter controller, thereby reducing power consumption during the standby operation.

According to the fourth and sixth technical aspects of the present invention, the PFC controller and light-load detector of the PFC can be integrated into one circuit, to realize the standby operation detecting function with a small number of parts.

INDUSTRIAL APPLICABILITY

The present invention is applicable to switching power source apparatuses having PFCs, DC-DC converters, and AC-DC converters.

This application claims benefit of priority under 35USC §119 to Japanese Patent Applications No. 2004-167493, filed on Jun. 4, 2004, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A switching power source apparatus having a power factor corrector and a DC-DC converter, the power factor corrector being connected to an AC power source and providing a first DC voltage, the DC-DC converter applying the first DC voltage to a primary winding of a transformer, carrying out an ON/OFF switching operation with a switching element, to convert the first DC voltage into a second DC voltage, and decreasing the frequency of the switching operation or shifting to an intermittent oscillation in case of a light- or no-load state, comprising:
   a first rectifying/smoothing circuit configured to rectify a voltage generated by a secondary winding of the transformer, smooth the rectified voltage with a first smoothing capacitor, and supply the rectified-and-smoothed voltage to a load;
   a second rectifying/smoothing circuit configured to rectify a voltage generated by a control winding of the transformer and smooth the rectified voltage with a second smoothing capacitor; and
   a light-load detector configured to detect if an output ripple of the second rectifying/smoothing circuit is equal to or greater than a predetermined value, determine upon detection that the switching operation has decreased the frequency thereof or has shifted to an intermittent oscillation, and make the power factor corrector inoperative.

2. The switching power source apparatus of claim 1, wherein:
   a second time constant determined by an impedance of the light-load detector and the second smoothing capacitor is set to be smaller than a first time constant determined by an impedance of the load and the first smoothing capacitor.

3. The switching power source apparatus of claim 1, wherein
   the light-load detector detects that the output ripple is equal to or greater than the predetermined value if an average output voltage of the second rectifying/smoothing circuit or a voltage corresponding to the average output voltage is equal to or smaller than a reference voltage.

4. The switching power source apparatus of claim 2, wherein
   the light-load detector detects that the output ripple is equal to or greater than the predetermined value if an average output voltage of the second rectifying/smoothing circuit or a voltage corresponding to the average output voltage is equal to or smaller than a reference voltage.

5. The switching power source apparatus of claim 1, wherein:
   the power factor corrector has a controller and the light-load detector, the controller turning on and off a second switching element, to rectify and convert an AC source voltage from the AC power source into the first DC voltage; and
   the controller and light-load detector are integrated.

6. The switching power source apparatus of claim 2, wherein:
the power factor corrector has a controller and the light-load detector, the controller turning on and off a second switching element, to rectify and convert an AC source voltage from the AC power source into the first DC voltage; and
the controller and light-load detector are integrated.

7. The switching power source apparatus of claim 3, wherein:
the power factor corrector has a controller and the light-load detector, the controller turning on and off a second switching element, to rectify and convert an AC source voltage from the AC power source into the first DC voltage; and
the controller and light-load detector are integrated.

8. The switching power source apparatus of claim 4, wherein:
the power factor corrector has a controller and the light-load detector, the controller turning on and off a second switching element, to rectify and convert an AC source voltage from the AC power source into the first DC voltage; and
the controller and light-load detector are integrated.

9. A power factor corrector connected to a DC-DC converter, the DC-DC converter supplying a first DC voltage to a primary winding of a transformer, carrying out an ON/OFF switching operation with a switching element, to convert the first DC voltage into a second DC voltage, and decreasing the frequency of the switching operation or shifting to an intermittent oscillation in case of a light- or no-load state, comprising:
a controller configured to turn on and off a second switching element, to rectify and convert an AC source voltage from an AC power source into the first DC voltage; and
a light-load detector configured to detect if an output ripple of a rectifying/smoothing circuit, which rectifies and smoothes a voltage generated by a control winding of the transformer, is equal to or greater than a predetermined value, determine upon detection that the switching operation has decreased the frequency thereof or has shifted to an intermittent oscillation, and make the controller inoperative.

10. The power factor corrector of claim 9, wherein
the controller and light-load detector are integrated.

* * * * *